May 5, 1936.  C. H. HOWLAND-SHEARMAN  2,039,842
MACHINE TOOL
Filed July 27, 1934   11 Sheets-Sheet 1
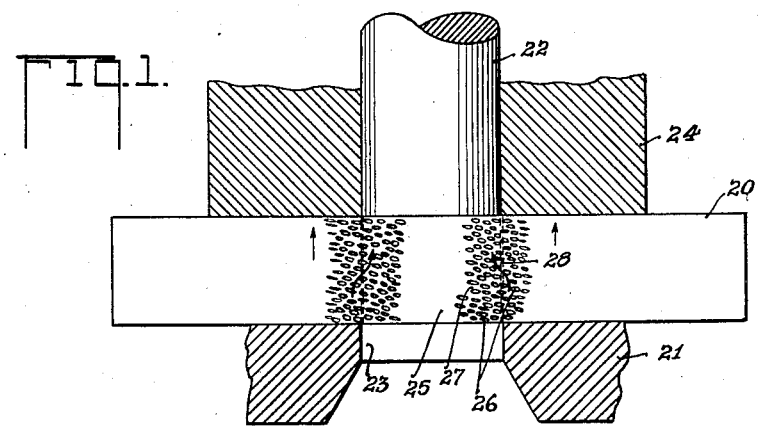
Fig.1.
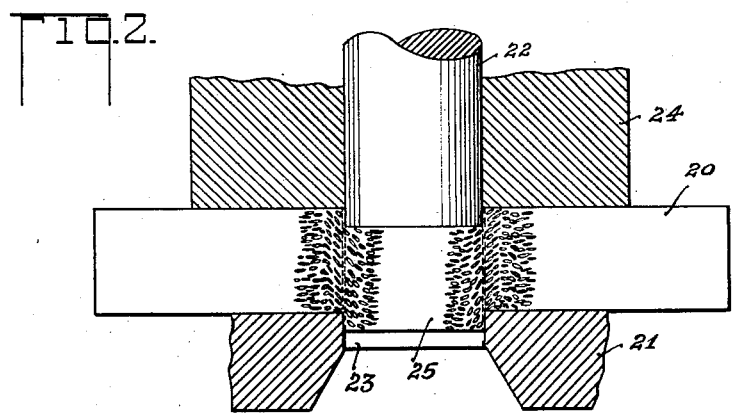
Fig.2.
Fig.3.
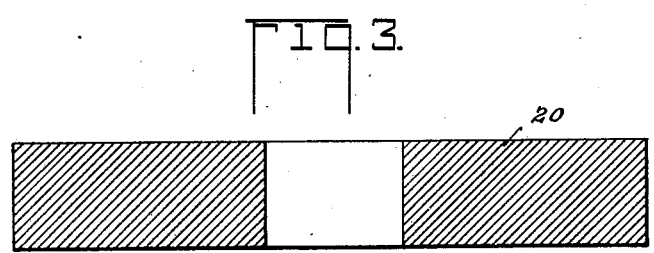
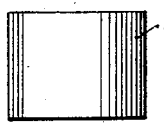
INVENTOR
CHARLES H. HOWLAND-SHEARMAN
BY
ATTORNEY

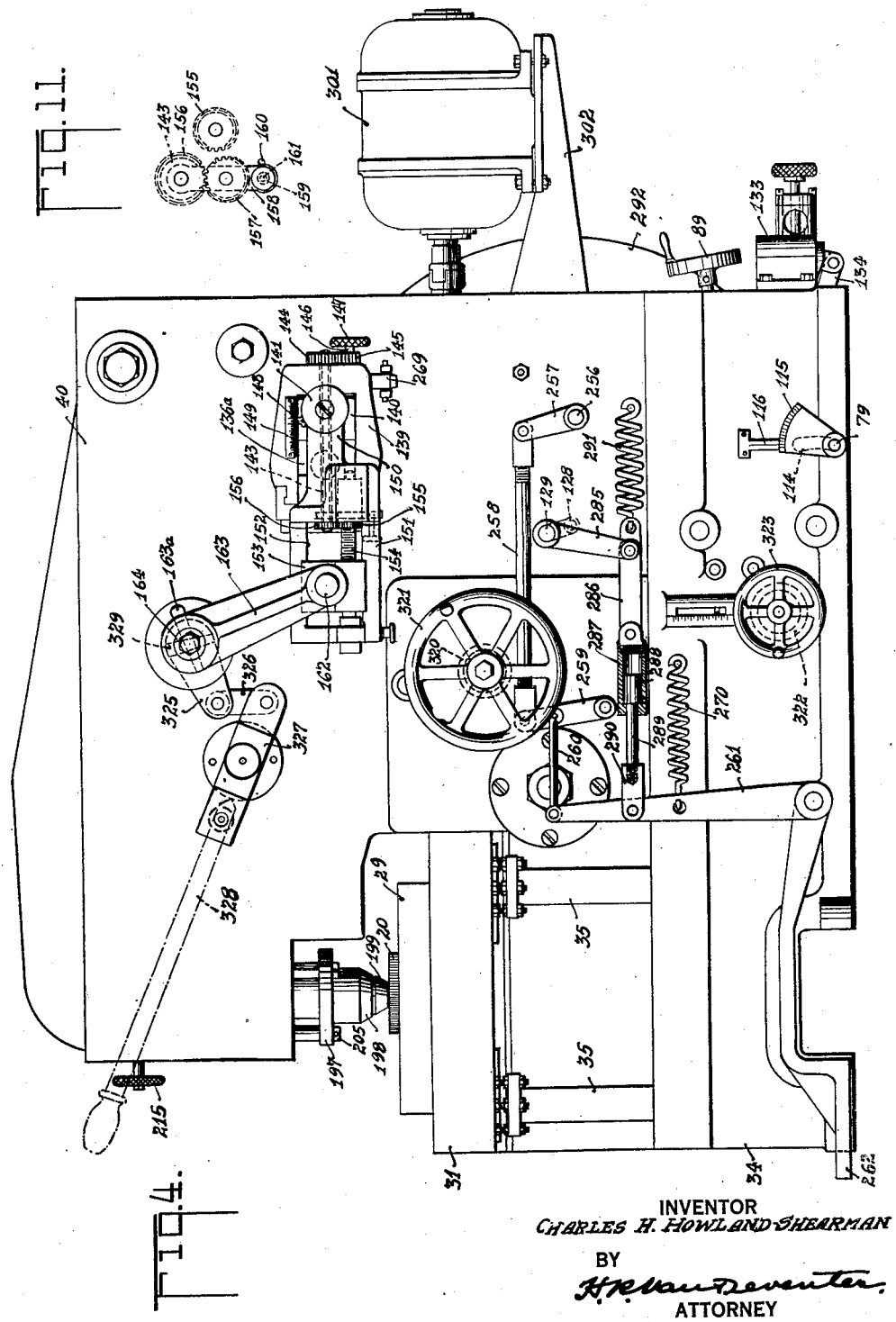

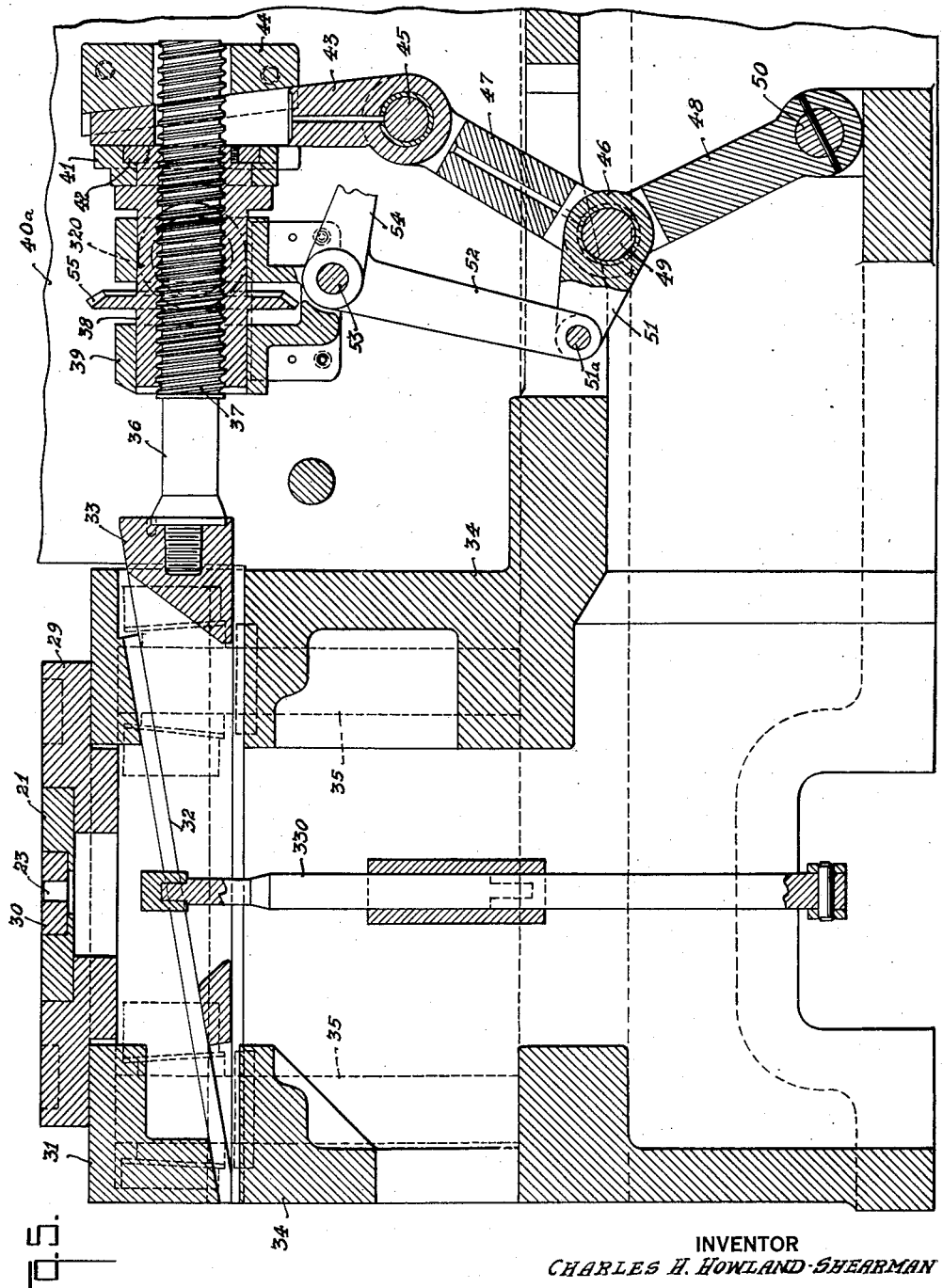

May 5, 1936.  C. H. HOWLAND-SHEARMAN  2,039,842
MACHINE TOOL
Filed July 27, 1934   11 Sheets-Sheet 4
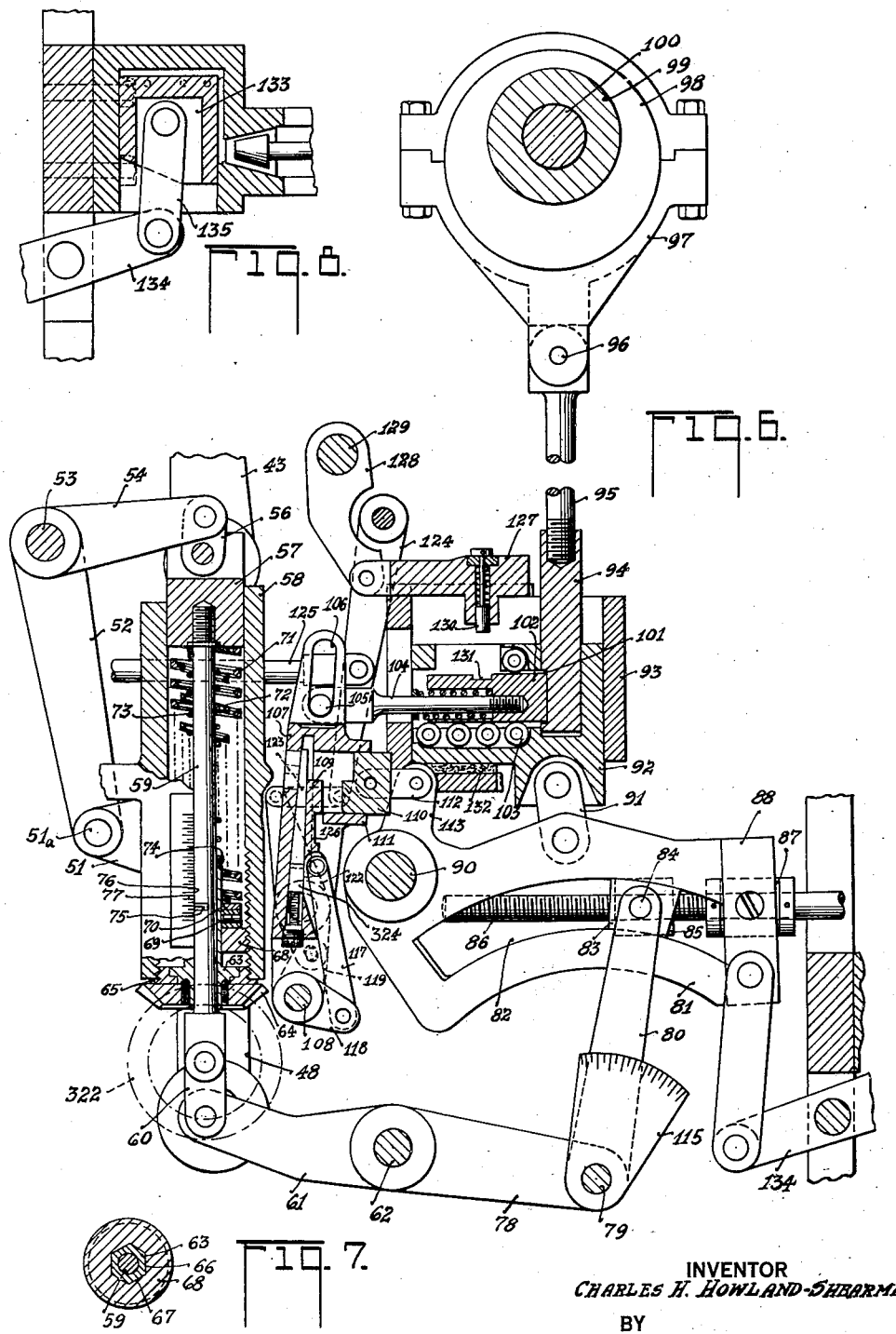
INVENTOR
CHARLES H. HOWLAND-SHEARMAN
BY
*H. R. Van Deventer*
ATTORNEY

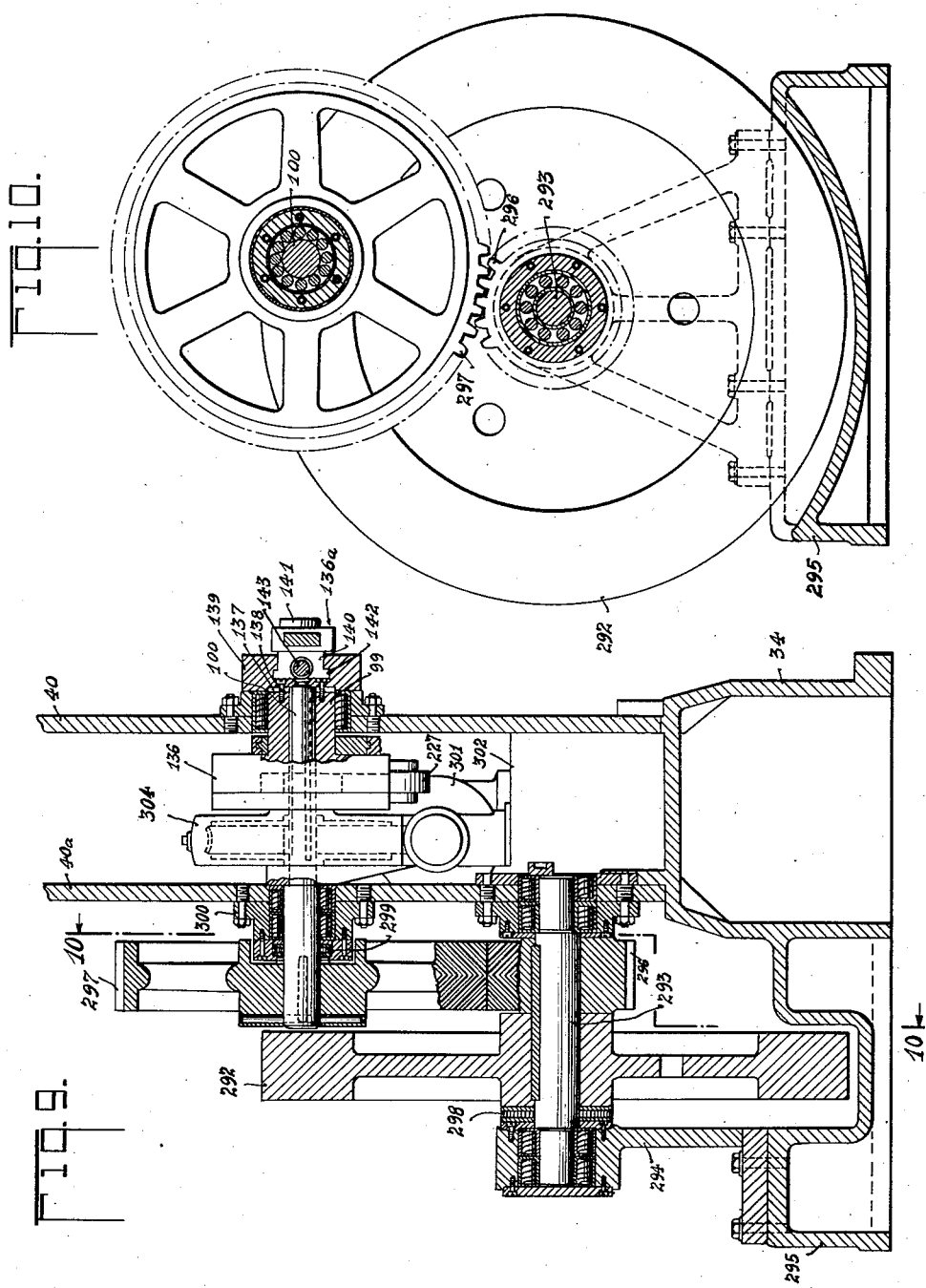

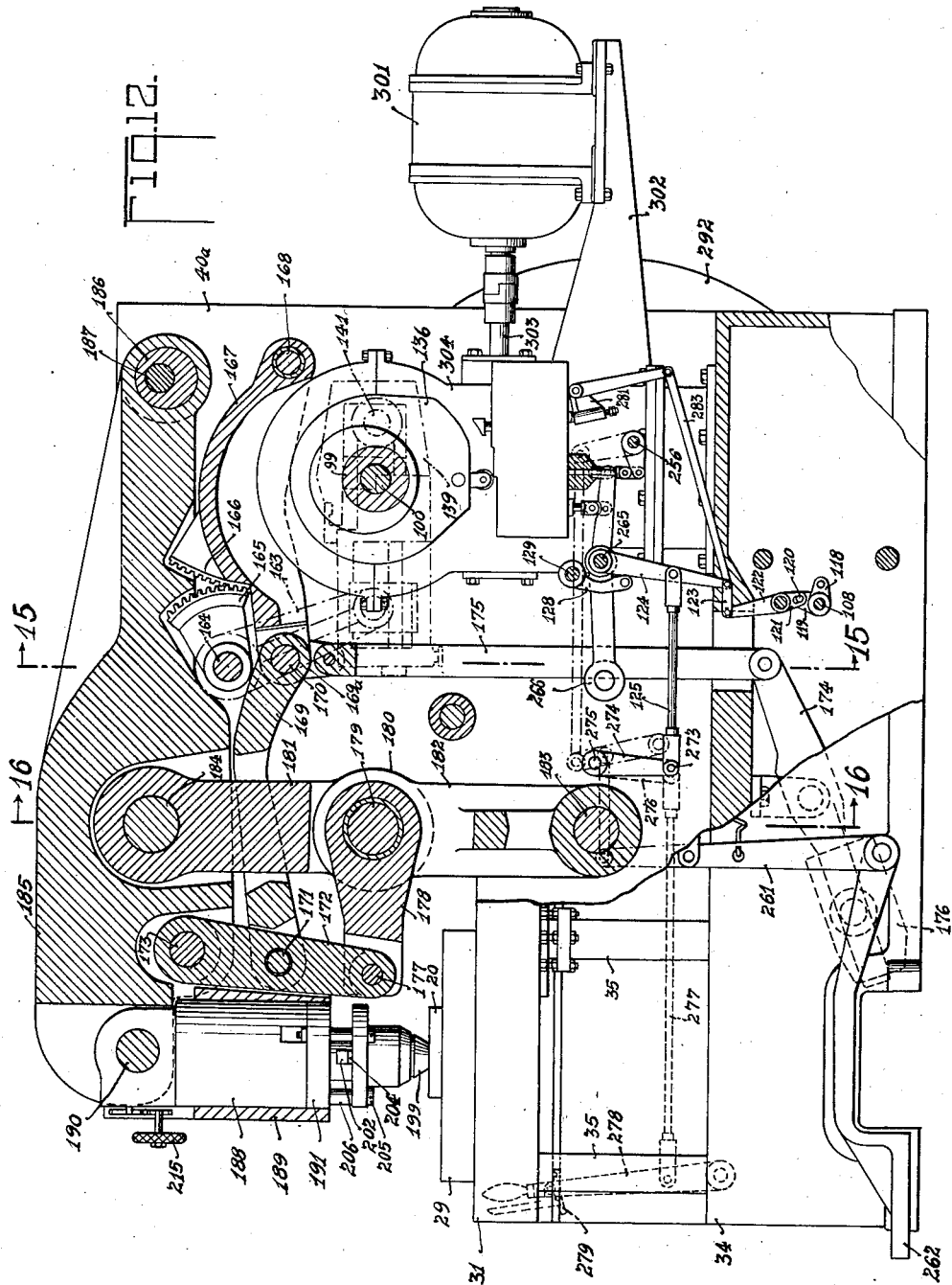

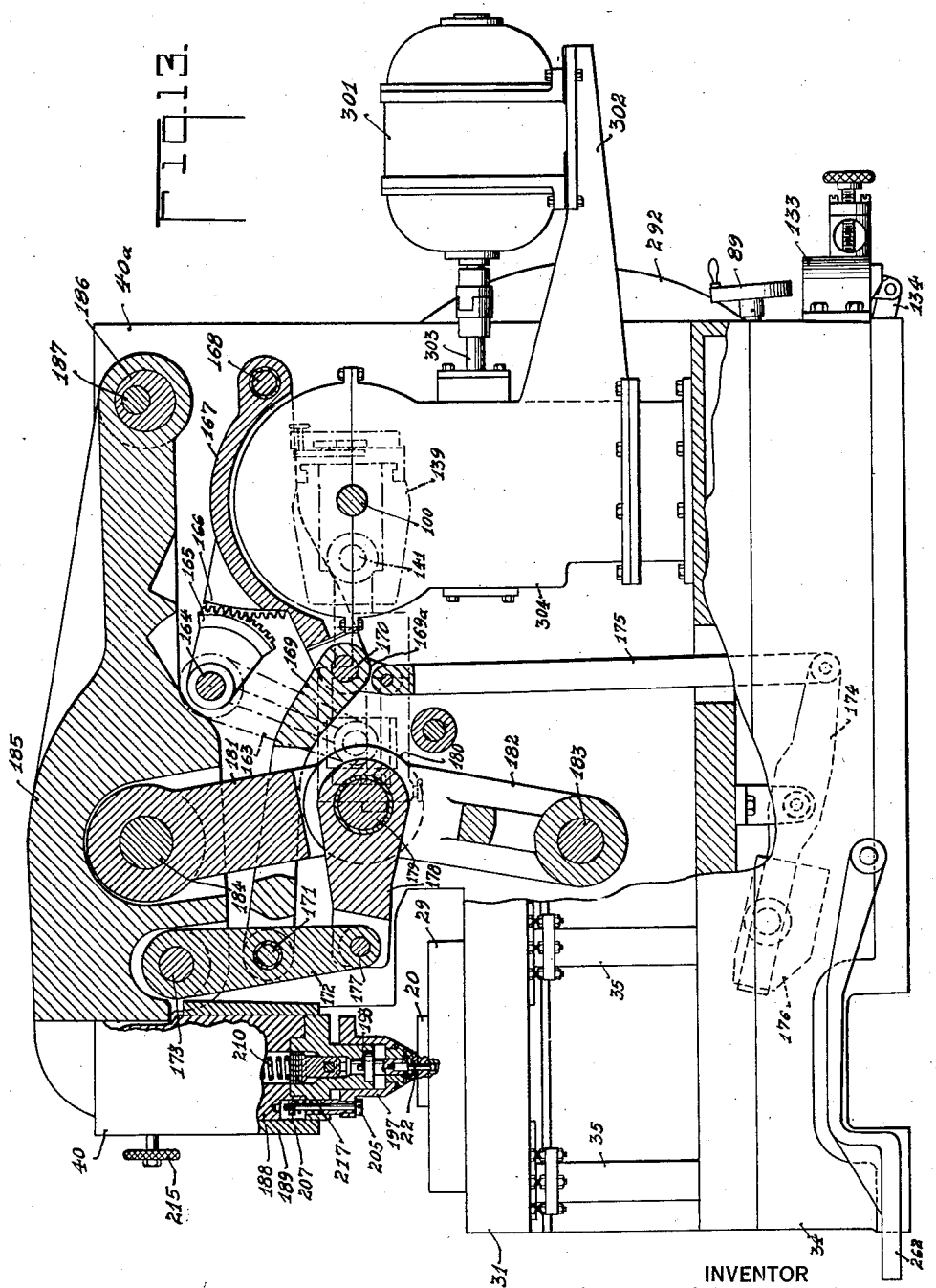

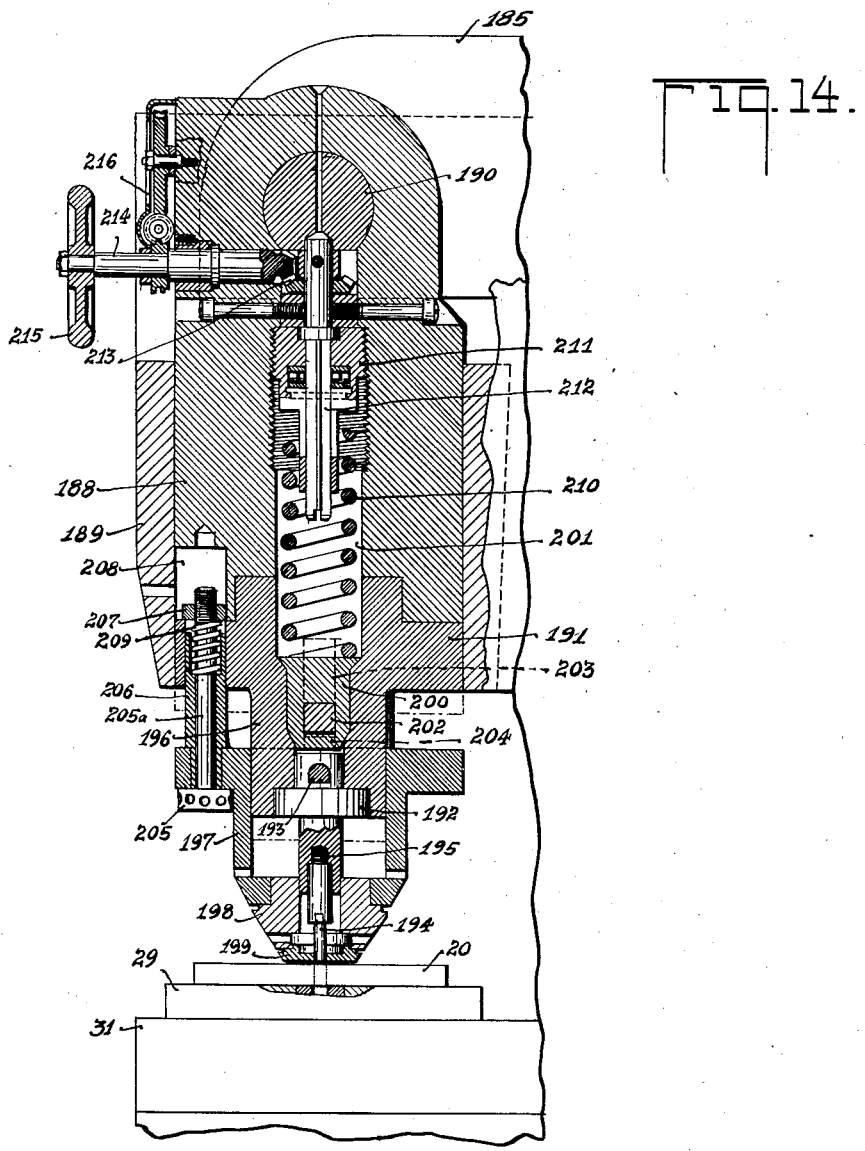

May 5, 1936.  C. H. HOWLAND-SHEARMAN  2,039,842
MACHINE TOOL
Filed July 27, 1934  11 Sheets-Sheet 9
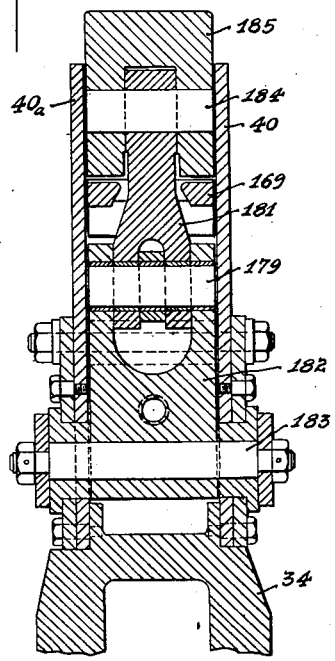
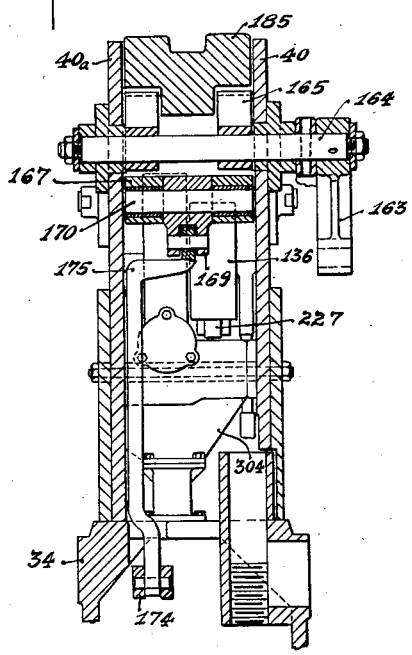
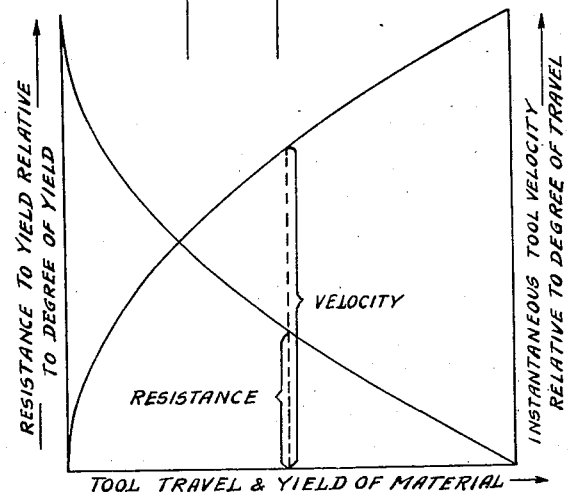
INVENTOR
CHARLES H. HOWLAND-SHEARMAN
BY
ATTORNEY May 5, 1936.   C. H. HOWLAND-SHEARMAN   2,039,842
MACHINE TOOL
Filed July 27, 1934    11 Sheets-Sheet 10

INVENTOR
CHARLES H. HOWLAND-SHEARMAN
BY
ATTORNEY

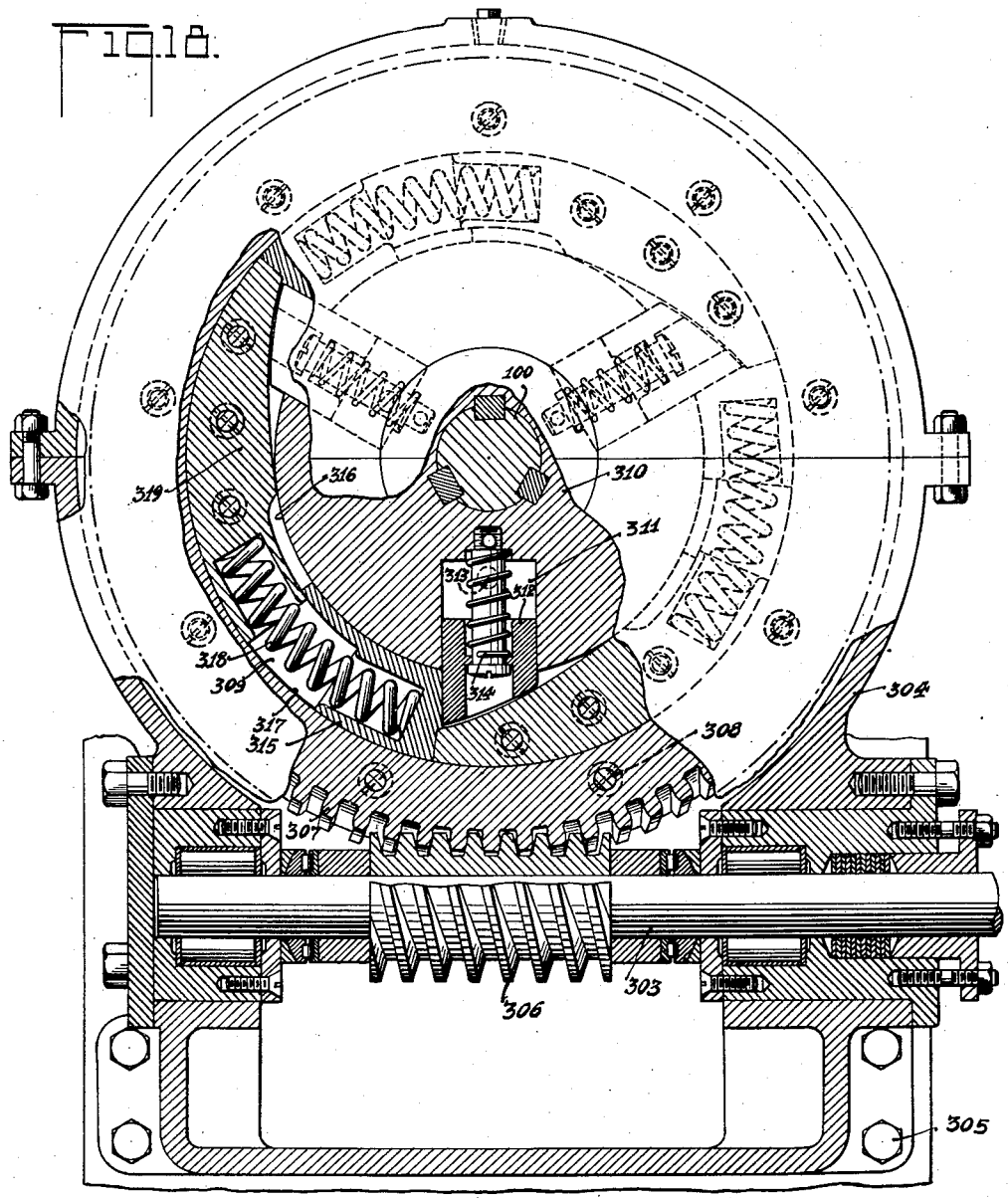

Patented May 5, 1936

2,039,842

UNITED STATES PATENT OFFICE 2,039,842

MACHINE TOOL

Charles H. Howland-Shearman, Hamden, Conn.

Application July 27, 1934, Serial No. 737,160

14 Claims. (Cl. 164—86)

This invention relates to apparatus for cold-working materials. In application Serial No. 702,286 is described and claimed a method of producing cold flow in certain types of materials.

The principal object of the present invention is to provide suitable means to carry out the above method. Other related objects will appear in the following description in connection with the accompanying drawings, in which Figures 1 and 2 are diagrammatic sectional views illustrating the method of producing cold flow.

Figure 3 is a view of the completed plug and remaining material.

Figure 4 is a general view of a Kinetor or tractor lever machine.

Figure 5 is a sectional view of the work table and related structures.

Figure 6 illustrates the mechanism for pulsating the table.

Figure 7 is a detail section of part of the spring motor adjusting means.

Figure 8 is a sectional view of the dash pot.

Figure 9 is a transverse section showing the flywheel, gearing and power shaft assembly.

Figure 10 is section of the same in the plane 10—10, Figure 9.

Figure 11 is a detail view of the micrometer crank transfer gearing.

Figure 12 illustrates the high pressure linkage at the beginning of the ram work stroke.

Figure 13 illustrates the same at the end of the work stroke.

Figure 14 is an enlarged view of the work head and fracture proofer.

Figure 15 is a transverse sectional view in the plane 15—15, Figure 12.

Figure 16 is a transverse section in the plane 16—16, Figure 12.

Figure 18 is a similar view of the flexible reducing drive mechanism.

Figure 19 is a diagram illustrating the speed, pressure and movement during cold flow as produced by the present invention.

Figure 17:
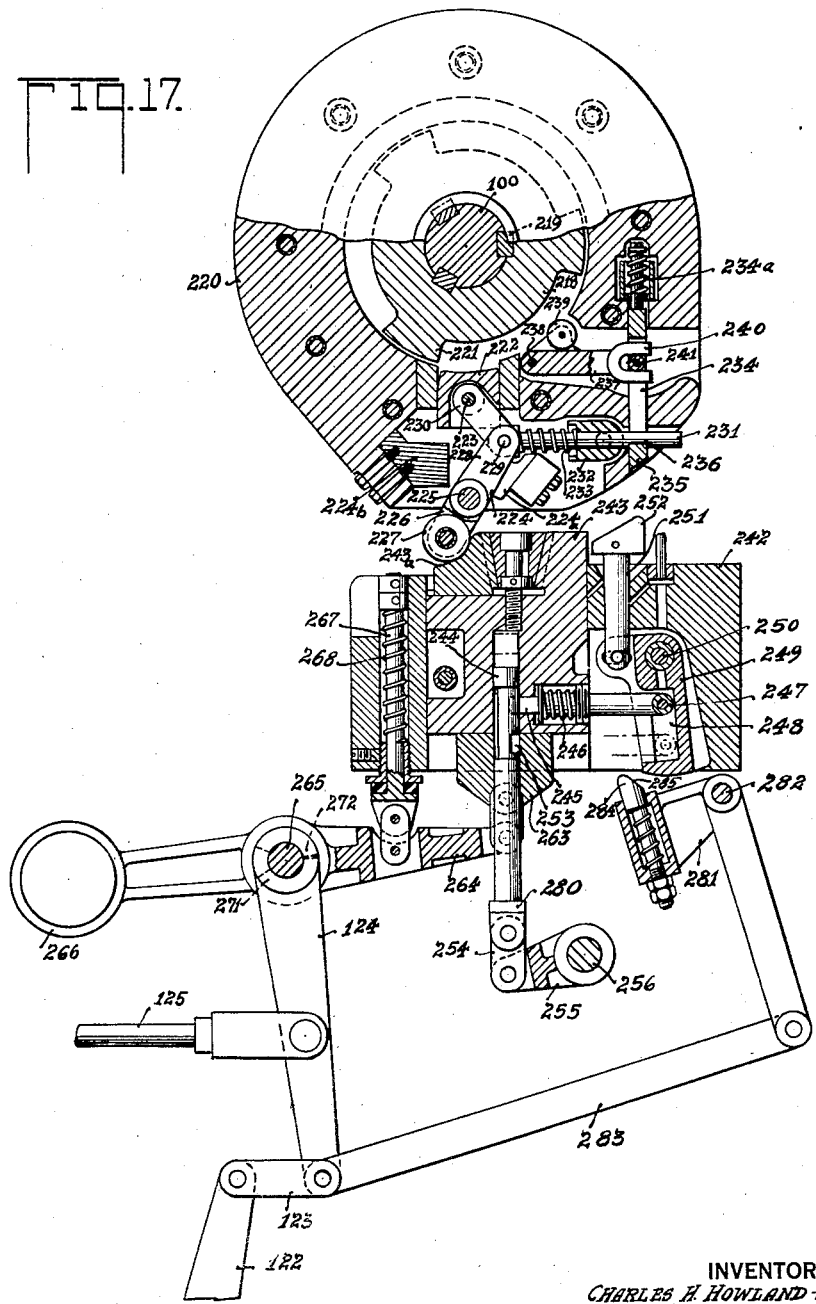
Figure 17 is a sectional view of the clutch.

In order to set forth clearly the prime functions of the apparatus provided for carrying out the method set forth and claimed in the above named application, a typical example of cold flow is described as follows, in connection with diagrammatic Figures 1, 2, and 3:

A work piece 20, assumed to be a steel plate from which it is desired to flow a cylindrical plug, is placed on a supporting rest plate 21 under a cylindrical tool 22 having a diameter equal to the desired plug. The rest plate 21 contains a hole 23 axially alined with the tool 22 and having a diameter greater than the tool by a slight clearance of the order of .0002 inch. Surrounding the tool 22 which is slidably fitted therein is a clamping member or fracture proofer 24.

An initial upward pressure is first applied by the rest plate 21 to the work piece 20. This pressure is transmitted through the work piece 20 to the fracture proofer 24 and to the tool 22 which resist the pressure. That portion of the work piece which is between the rest plate 21 and fracture proofer 24 is held rigidly in compression, while that portion 25 under the tool 22 exerts an upward pressure against the latter.

A relatively large pressure is now applied downward by the tool, starting from rest with very low initial speed. It has been determined that the typical structure of steel is an aggregate of crystalline particles, indicated by the numeral 26, Figures 1 and 2, suspended in and cemented together by amorphous material or flux 27. It has furthermore been determined that when steel is stressed beyond its elastic limit the change from elastic to a plastic or yielding state occurs suddenly, marking a sharp or instantaneous point in the pressure transit. When the downward or working pressure is applied by the tool 22 to the portion 25 which is not directly supported by the rest plate 21 and fracture proofer 24, the entire working pressure is resisted by the cylindrical zone 28 of microscopic thickness forming the boundary of the portion 25. As the working pressure is built up rapidly but without sufficient tool movement to cause ordinary rupture, the material in the entire zone 28 suddenly changes from the elastic to the plastic state. The crystals 26 flow through the amorphous matter 27 which acts as a flux and the portion 25 under increasing speed and movement of the tool is ejected through the hole 23. During the flow the crystals originally forming a part of the zone or slip plane 28 are forced or compacted into the surfaces of the plug and hole and the amorphous matter is swept along the cylindrical plane, appearing in the finished hole and on the finished plug as minute striations parallel to the direction of force application.

It has further been determined that the pressure resistance to yield in steel stressed beyond its elastic limit falls off in parabolic relationship to the increase in yield. As applied pressure and resisting pressure are always equal, and as speeds and pressures are inversely proportional throughout a mechanical linkage, it is evident that the tool 22 must be caused to apply its pressure to the portion 25 at speed increasing in parabolic relation to its increase of travel in order to follow accurately the natural yield of the material and produce cold flow. In other words, too great a speed would cause fracture rather than flow, while too slow a tool motion would cause lag and jerk, similarly giving rough and inaccurate parting. The tool 22 in the present invention is caused by means hereinafter described to move in unison with the natural yield of the material, producing plugs and holes having polished surfaces characterized by the microscopic striations noted above and corresponding accurately to the size and contour of the tool. Due to the compacting of the crystals along the surfaces, these surfaces have a hardness considerably greater than that of the original material.

It should be noted that in the process described the tool does no cutting of the material, its functions being to map the area to which working pressure is to be applied and to apply the working pressure thereto which causes the phenomenon of cold flow.

Figure 4 is a general view of a machine, hereinafter referred to as the Kinetor, adapted to carry out the process described above. In order to set forth clearly the manner in which the functions of the machine are performed, the principal functions will first be taken up individually in describing the particular structures which perform them.

The principal functions necessary to the process described are as follows:
1. Application of upward pre-pressure.
2. Application of downward working pressure.
3. Fracture-proofing.

Fracture proofing must accompany the entire application of working pressure and is initiated by the upward pre-pressure which is also applied to the tool and which is therefore the first essential to the process. This pre-pressure is supplied by a pulsating table mechanism of the type fully described in co-pending application Serial No. 737,157 and hereinafter explained in its embodiment in the present invention.

*Pulsating table mechanism*

Figures 5 and 6 show the construction of the above mechanism. Referring to Figure 5, the rest plate 21 is seen to be supported in a bolster 29. In this embodiment the plate 21 has an insert 30 containing the hole 23. The bolster 29 is secured to a table 31 having an inclined lower surface 32 bearing on a hollow slidable wedge 33 which in turn is supported on the base 34 of the machine. The table 31 is guided vertically by stationary rails 35 attached to the base 34. A manually reciprocable knockout rod 330 is provided to facilitate removal of the rest plate 21 from the bolster 29.

Attached to the wedge 33 is a heavy rod 36 having a long worm thread 37 on which is screwed a sleeve member 38 rotatably and slidably mounted in a guide 39 attached to supporting side plates 40 and 40a which are secured to the base 34. A shoe 41 is retained on the right end of the sleeve 38 by means of a screwed collar 42, the sleeve 38 and collar 42 being rotatable in the shoe 41.

A second wedge 43 is dovetailed in vertically sliding relation to the shoe 41, and is also slidably dovetailed to an inclined stationary backing member 44. The lower end of the wedge 43 is articulated by means of a pin 45 to a toggle 46 comprising upper and lower arms 47 and 48 jointed together on a pin 49. The lower arm 48 is secured to a pin 50 rotatably anchored in the base 34. A link 51 and pin 51a connect the central toggle pin 49 to a bell crank lever 52 fulcrumed on a stationary pin 53 and having a substantially horizontal arm 54 extending toward the rear of the machine.

It will be seen that a counter-clockwise swing of the bell crank 52 operates the toggle 46 to raise the wedge 43, force the shoe 41, cylindrical member 38, rod 36 and wedge 33 to the left, and thus raise the table 31. Similarly a clockwise movement of the bell crank 52 draws down the wedge 43, and as 43 is dovetailed to both the backing member 44 and the shoe 41, the wedge 33 is positively withdrawn, allowing the table 31 to move downward by gravity to its lower position as shown.

The sleeve 38 carries a bevel gear wheel 55 which may be revolved by a mating bevel gear 335 operable by an exterior hand wheel 321, Figure 4, to screw the rod 36 to the right or left and thus effect an initial vertical adjustment of the table 31.

As shown in Figure 6, the arm 54 of the bell crank 52 is connected by a short oscillating link 56 to a plunger 57 which is slidable vertically in a stationary cylinder 58 formed integrally with or secured to the base 34. A vertical rod 59, fastened to the plunger 57, extends concentrically through the cylinder 58 and is connected by a short oscillating link 60 with a walking beam 61 fulcrumed on cross pin or shaft 62. A flanged sleeve 63 having attached thereto a bevel gear 64, having a meshing bevel gear 322 operable by an exterior hand wheel 323, Figure 4, is rotatably retained in a stepped bushing 65 screwed into the lower end of the cylinder 58, and surrounds the rod 59. The sleeve 63 is formed with a hexagonal exterior 66 slidably engaging a hexagonal hole 67 in a nut 68 which is threaded into the cylinder 58. By turning the gear 64 and with it the sleeve 63 the nut 68 may be screwed upward or downward in the cylinder 58.

The nut 68 supports a roller thrust bearing 69 which in turn supports a plate 70. Concentric compression springs 71 and 72 are disposed between the plate 70 and the plunger 57. A third spring 73 is disposed between a thrust ring 74 on the top of sleeve 63 and the plunger 57. The three springs thus urge the plunger 57 upward and the effective pressure of the outer two springs 71 and 72 may be varied by adjusting the nut 68 upward or downward in the cylinder 58 as previously explained, the bearing 69 preventing torsion of the springs during adjustment. The plate 70 has an indicating finger 75 protruding through a slot 76, Figure 1, so as to register with an exterior visual scale 77 graduated to correspond with the calibrated strengths of springs 71, 72, and 73.

The rearwardly extending arm 78 of the walking beam 61 is articulated on a pin 79 fastened to a yoke 80 which spans a beam 81, hereinafter referred to as the micrometer beam. Circular slots 82 in the beam 81 contain slidable segments 83 which are pivoted on pins 84 fixed in a nut 85. The pins 84 are also pivotally engaged by the yoke 80. The nut 85 is disposed on a micrometer screw 86 rotatably retained in a sleeve 87 trunnioned in the rear end 88 of the beam 81. An exterior hand wheel 89, Figure 1, is provided on the screw 86.

The micrometer beam 81 swings on a stationary cross pin 90 and is centrally connected by means of an oscillating link 91 to a release plunger 92 slidable vertically in a stationary guide 93. A lift plunger 94 is slidable vertically in the release plunger 92 and is connected by a rod 95 and pivot pin 96 to an eccentric strap 97. The strap 97 engages an eccentric 98 secured to the driven member 99 of a clutch disposed on the power shaft 100 of the machine as hereinafter described.

The lift plunger 94 has a lateral notch 101 adapted to be engaged by a spring pressed latch 102 moveable on rollers 103 in the release plunger 92. A rod 104 fastened to the latch 102 carries a cross pin 105 engaging a slot 106 in a release lever 107 rockably mounted on a cross shaft 108. The release lever 107 carries a block 109 adapted to be engaged by a trip block 110 horizontally slidable in an extension 111 of the lever 107 and connected by a link 112 with an upward extension 113 of the micrometer beam 81.

Starting from the position shown in Figure 6, the eccentric 98 is revolved by the driven member 99. The lift plunger 94 is drawn upward. As the latch 102 is in the notch 101 the rise of the lift plunger carries with it the release plunger 92, swings the micrometer beam 81 counter-clockwise, raises the yoke 80, and acting through the walking beam 61 and rod 59, draws the plunger 57 downward, thus compressing the springs 71, 72, and 73. At the same time the bell crank 52 is swung clockwise, drawing out the toggle 46 and retracting the wedge 33 to lower the table 31 as shown in Figure 5.

As the lift plunger 94 approaches its top position the counter-clockwise swing of the micrometer beam 81 causes the trip block 110 to engage the block 109, swinging the lever 107 to the left. The latch 102 is thereby withdrawn from the notch 101, releasing the plunger 92 and its attached linkage. The springs 71, 72, and 73 expand, forcing up the plunger 57, rocking the bell crank 52 counter-clockwise, straightening the toggle 46 and raising the table 31 with a pressure determined by the setting of the springs multiplied by the combined mechanical advantages of the toggle and both wedges. As these mechanical advantages are fixed it is evident that the upward table pressure is determined directly by the compressive setting of the springs 71, 72, and 73. For this reason the scale 77 may be graduated directly in terms of table pressure.

By moving the segments 83 along the slots 82 nearer to or farther from the fulcrum 90 of the micrometer beam 81 by means of the micrometer screw 86, the amplitude of motion transmitted to the walking beam 61 and hence the amplitude of table pulsation may be varied. The slots 82 are cut on a radius struck from the center of pin 79 when the parts are in the position shown in Figure 6, hence no alteration of initial or lower position of the beam 61 and consequently that of the table 31 is effected by moving the segments 83. The pin 79 protrudes through a slot 114 in the base 34 as shown in Figure 1 and carries a dial 115 adapted in lower position to register with a stationary pointer 116. The position of the segments 83 being a direct measure of the table stroke, the dial 115 is calibrated directly in terms of amplitude of table pulsation.

In the operation described the latch 102 was withdrawn to trip the mechanism automatically by engagement of the trip block 110 and block 109. In case it is desired to operate the trip manually the following provision is made:

The block 109 is slidable vertically in the lever 107. A link 117 connects the block 109 with a short lever 118 fastened to the cross shaft 108. A second short lever 119 on shaft 108 carries a pin 120 engaging a slot 121 in a double ended lever 122 which is connected by a link 123 to a swinging lever 124 as shown more clearly in Figure 12. An operating rod 125 is articulated to the lever 124. When the lever 124 is swung counter-clockwise by means of the rod 125, the shaft 108 is also rocked counter-clockwise, and the lever 118 and link 117 move the block 109 upward until a notch 126 formed therein comes opposite the trip block 110. When the trip block now moves to the left it enters the notch 126 instead of encountering the block 109. As a result the lever 107 is not actuated to withdraw the latch 102, which thus remains engaged.

Slidably dovetailed to the top of the stationary guide 93 is a manual trip block 127 movable by a slotted lever 128 fastened to a rockable shaft 129. The block 127 contains a downwardly spring-pressed plunger 130 adapted to engage a notch 131 in the top of the latch 102. When, therefore, the release plunger 92 nears the top of its stroke the plunger 130 engages the slot 131. If the shaft 129 is now turned clockwise by manual means hereinafter described, the lever 128 moves the block 127 and latch 102 to the left, withdrawing the latter from the notch 101. The mechanism is thus tripped and the table given its upward pulsation as previously described.

The release plunger 92 is provided with a stop cushion 132 of raw hide or other suitable material secured to the base 34. The motion of the parts after tripping may also be cushioned by an adjustable dash pot 133, Figure 8, actuated through a walking beam 134 and link 135 by the micrometer beam 81.

The downward or working pressure is applied by power derived from the power shaft 100 through a clutch 136, Figure 9, hereinafter described in preferred form, a micrometer crank mechanism 136a of the type fully described in co-pending application Serial No. 737,158 and a combination of elements hereinafter described and referred to as the high pressure linkage.

*Micrometer crank mechanism*

Secured to the outer or hub end of the driven member 99 of the clutch 136 by means of integral cross keys 137 and locating bolts 138 is a crank body 139. A block 140 carrying a crank pin 141 is slidably retained in stepped ways 142 in the body 139 and is movable by means of a micrometer screw 143 rotatably retained therein. The right end of screw 143 carries a spur gear 144 meshing with a pinion 145 on a stub shaft 146 rotatably mounted in the end of body 139 and equipped with a manual adjusting wheel 147. By turning the wheel 147 the block 140 and crank pin 141 may be moved nearer to or farther from the center line of the shaft 100, thus varying the throw of the crank. A pointer 148 on the block 140 registers with a scale 149 on the body 139. As the stroke of the tool 22 is governed by the length of crank throw, the scale 149 is calibrated directly in terms of tool stroke.

Rotatably fitted on the crank pin 141 is a connecting rod 150 having a body 151 formed with internal longitudinal ways 152 in which a block 153 is moveable by means of a second screw 154 rotatably retained in 151 and having a lead identical with that of the micrometer screw 143, but of opposite thread. A wide spur gear 155 is fastened to the screw 154 in such a position that when the crank and connecting rod are at right dead center as in Figure 4, the gear 155 is located in line with a similar gear 156 on the micrometer screw 143. An idler gear 157 on an arm 158 swung about the micrometer screw 143 and meshed with the gear 156 may be swung into mesh with the gear 155 as illustrated in Figure 11 when the gears are alined as noted above. A locating pin or button 159 in the arm 158 is adapted to engage holes 160 and 161 to hold the idler gear 157 in meshed or free position respectively.

The block 153 carries a wrist pin 162 which engages a lever 163 fixed by means of a heavy shear pin 163a to a cross shaft 164 journalled in the side plates 40 and 40a. With the parts in left dead center position as shown in Figure 1, and with the idler or transfer gear 157 in mesh, rotation of the micrometer screw 143 causes a similar rotation of the screw 154. The screws being of opposite thread and of the same lead, as the crank pin 141 is moved relative to the shaft center, carrying with it the connecting rod 150, the block 153 and wrist pin 162 are moved the same distance in the opposite direction relative to the connecting rod body 151. Thus the effective length of the connecting rod is changed to compensate for the change in crank throw, the wrist pin 162 and lever 163 retaining their initial positions without change.

The crank throw having been adjusted, the transfer gear 157 is thrown out of mesh.

High pressure linkage

Referring to Figures 12 and 14, the cross shaft 164 carries a pair of segmental gears 165 meshing with corresponding segments 166 on an arm 167 pivotally anchored to the side plates 40 and 40a by a pin 168. A second arm 169 of the same length as 167 is articulated to the latter by a pin 170. The left end of arm 169 is jointed by means of a pin 171 to the middle portion of a substantially vertical lever 172 swung on a cross pin 173 secured to the side plates 40 and 40a. When the device is in normal position as shown in Figure 12 the pins 168, 170, and 171 lie in a straight line, fulfilling with the arms 167 and 169 physical definition of an infinite plane. This combination of pins and arms constitutes a tractor lever 169a hereinafter referred to as the secondary tractor lever.

A walking beam 174, trunnioned to the base 34 and connected to the pin 170 by a link 175, carries a counter-weight 176 which balances the weight of the arms 167 and 169, thus relieving the teeth of segments 165 and 166 of all strain except that imposed by the working force transmitted through them.

The lower end of lever 172 carries a pin 177 which is connected by a link 178 to the central pin 179 of a primary tractor lever 180 comprising upper and lower arms 181 and 182. The lower arm 182 is anchored on a pivot 183 secured in the side plates 40 and 40a. The upper arm 181 is secured to a pin 184 journalled in a massive tool beam 185, the pins 179, 183 and 184 normally being alined to form a primary infinite plane. Rotatably retained in the right or rear end of the beam 185 is an eccentric bushing 186 which is rotatably mounted on a stationary anchor pin 187. A ram 188, slidable vertically in a guide 189 secured to the side plates 40 and 40a, is secured to a heavy pin 190 pivotally journalled in the left or front end of the beam 185. A flanged cylindrical member 191 forming the lower portion of the ram 188 has a tool holder 192 socketed therein and secured by a tapered cross key 193 as shown in enlarged section in Figure 14. The tool holder 192 may be adapted to carry a plurality of tools of any desired shape, but in the present illustration holds a single cylindrical tool 194 held in place by a screw thread 195.

The manner in which the power derived from the shaft 100 is transferred through the high pressure linkage to the tool 194 and work piece 20 is as follows:

When the crank pin 144 is at right hand dead center the primary and secondary tractor levers are in their straight or infinite plane positions and the tool 194 is at the top of its stroke as shown in Figure 12. The alinement of the tractor levers is assured by the application of upward pre-pressure through the work piece to the tool 194 by a pulsation of the table 31 as previously described. This upward pressure tends to raise the beam 185, placing both tractor levers under initial tension which brings their respective end and center pins into correct alinement as stated. At the same time any lost motion which may have developed in the linkage due to wear is taken up.

Referring to Figure 12, the crank pin 141 now moves counter-clockwise from right dead center. The arm 163 and cross shaft 164 are thereby rocked clockwise. The segment 165 moves the meshing segment 166 downward, swinging the lever 167 about the anchor pin 168. The secondary tractor lever 169a is thus forced out of its alined or infinite plane position, drawing the pin 171 and vertical lever 172 to the right, causing the link 178 to push the central pivot 179 of the primary tractor lever 180 to the right. As the lower arm 182 is pivotally anchored to the base 34, the pull of the primary tractor lever draws the pin 184 downward rocking the beam 185. The ram 188 moves downward in the guide 189 to force the tool 22 through the work piece 20 as shown in Figure 13 flowing out the plug 25, Figure 3.

The crank pin 141 revolves past left dead center and continues on to right dead center, withdrawing the tool 22 from the work and restoring the parts to their initial position as shown in Figure 12.

In the description of the process of cold flow it has been set forth that the natural resistance to flow of the material decreases in parabolic proportion to the increase of yield. The tool producing the flow must supply the pressure necessary to overcome the resistance and must travel at such speed as to exactly keep pace with the natural yield.

The characteristic action of a tractor lever is the exact opposite of a toggle, that is, as the former is actuated it exercises a mechanical advantage starting at infinity at the instant of departure from the infinite plane and decreasing in falling curved relation to the increase of output travel. At the same time, since relative speed and mechanical advantage in any mechanical linkage are inversely proportional, the speed increases in rising curved relation to the increase of output travel.

In the preferred form of the invention as herein illustrated, the primary and secondary tractor levers, together with their co-acting parts, are so proportioned that their compound action moves the tool 22 downward with a velocity increasing in parabolic relation to its increase of travel. Inversely, the tool pressure for a given power decreases in parabolic relation to the tool travel. The tool therefore is actuated in the manner necessary to produce cold flow as previously described.

Theoretically the tool is capable of exercising an infinite initial downward pressure, as the mechanical advantages of both tractor levers are infinite as they start their motion from the infinite plane. Actually, of course, no infinite pressure occurs, as the maximum pressure is determined by the yield point of the material being worked. What actually does occur is that the upward pressure applied by the table having assured that no lost motion remains and that the tractor levers are fully extended, the tool moves downward from rest and with very slight motion quickly applies sufficient pressure to overcome the elasticity of the material which yields and flows as described, the tool speeding up to keep pace with the yield and supply the working pressure until flow is complete.

With some materials the flow is completed and the plug completely severed during the early stages of the stroke, the remainder of the stroke serving to eject the plug.

Referring to diagram, Figure 19, it should be noted that the values plotted do not represent absolute velocities, pressures, etc., but purely relations between these properties. In other words, the production of cold flow depends on the maintenance of proper relationship between pressures, speeds and travel rather than on their absolute magnitudes. The ability to maintain the above proper relationship within its range is inherent in the present invention, which is therefore adaptable to a wide variety of speeds and materials, and may be constructed in any desired size so long as the proper proportions of the high pressure linkage are followed.

In a preferred form as reduced to practice, the following data are given as illustrating a proper proportioning of the parts:

| | |
|---|---|
| Maximum stroke of ram | 1 9/16" |
| Radius of primary tractor lever arms 181 and 182 | 19.125" |
| Radius of secondary tractor lever arms 167 and 169 | 25.875" |
| Maximum working pressure capacity | 1,500,000 lbs. |
| Angularity of primary tractor lever at the end of 1/64 inch tool stroke | 1° 19′ 27″ |
| Angularity of secondary tractor lever | 5° 17′ 45″ |
| Combined kinetic efficiency or mechanical advantage of tractor lever linkage and tool beam at end of 1/64 inch tool stroke | 58.308 |
| Angularity of primary tractor lever at end of 1 9/16 inch tool stroke | 13° 24′ 8″ |
| Angularity of secondary tractor lever | 16° 53′ 16″ |
| Combined kinetic efficiency or mechanical advantage of tractor lever linkage and tool beam at end of 1 9/16 inch tool stroke | 1.728 |

From the above it will be noted that the mechanical advantage drops from 58.308 to 1.728. The speed ratio, being the inverse of the mechanical advantage, rises correspondingly. If the values of mechanical advantage and velocity ratio are plotted for corresponding increments of tool advance between the two extremes noted, the result is a pair of curves following the characteristics illustrated in Figure 19.

Fracture proofer

The function of fracture proofing, that is maintaining the structure of material surrounding the work area intact during the work stroke, may be performed by a device of the type fully described in co-pending application Serial No. 737,156, and herein described as follows, referring to Figure 14:

Slidably guided on the lower cylindrical portion 196 of the lower ram member 191 is a shell 197. A nose 198, slidably fitted around the tool holder 192, is secured in the lower end of the shell 197. A contact shoe 199 corresponding to the member 24, Figure 1, closely fitted around the tool 194, is fastened in the lower end of the nose 198.

A bolster plug 200 is slidably socketed in the bottom of a central hole 201 in the lower member 191 and ram 188, and carries a cross key 202 extending outward through lateral slots 203 in the member 191 so as to engage upward extensions 204 on the shell 197. The initial position of the shell 197 is determined by adjustment of heads 205 of bolts 205a extending through guide sleeves 206 slidable in 191. The bolts 205a carry upper threaded nuts 207 slidable in slots 208 in the ram 188 and are urged upwards by springs 209.

A heavy compression spring 210 in the hole 201 engages the top of the bolster plug 200. A nut 211, shown in retracted position, threaded into the hole 201, is adapted to be screwed downward to place any desired initial compression on the spring 210 by means of a squared shank 212 connected by bevel gears 213 and a shaft 214 to an exterior hand wheel 215. A rotary dial 216, geared to the shaft 214, may be calibrated with the spring 210 to indicate the pressure placed thereon by the nut 211.

The operation of the fracture proofer is as follows:

Normally the contact shoe 199 is spaced slightly beyond the end of the tool 194. As the table 31 pulsates upward to apply the initial pressure as previously explained the work piece 20 first engages the shoe 199 forcing the shell 197, cross key 202 and bolster 200 upward against the pressure of spring 210 as previously determined by the setting of nut 211, until the tool 194 is also engaged by the work piece. The initial upward pressure on the tool insures extension of the tractor levers and absence of lost motion as previously explained.

As the tool 194 starts downward the part of work piece 20 surrounding the tool is held in compression due to the heavy spring 210. As the tool moves through 20 the ram 188 moves downward relatively to the shell 197, key 202 and bolster plug 200. At the same time the nut 211 is carried downward by the ram, thereby further compressing the spring 210 and increasing the pressure applied through the shoe 199 to the piece 20. The fracture proofing pressure is thus resiliently increased from a pre-determined initial amount as the stroke progresses, holding the portion of 20 surrounding the work area intact. The amount of pressure necessary for fracture proofing different types of work pieces having been determined, the initial adjustments of the spring 210 are made accordingly. If desired, the range of the spring may be further varied by the use of shims such as 217, Figure 13. The spring 210 may also be removed and replaced by another of different range.

At the completion of the upward or return stroke of the ram 188 the nuts 207 engage the top of the member 191 as shown in Figure 14, causing the shoe 199 to disengage the work piece 20 when the table 31 is withdrawn downward as previously explained. The work piece 20 may now be removed and replaced with a fresh blank.

Clutch

The clutch 136 by which power is delivered from the shaft 100 to the high pressure linkage and to the pulsating table mechanism is preferably of the type similar to that fully described in co-pending application Serial No. 737,155 herein illustrated in Figure 17. In the above figure the numeral 218 indicates a driving member secured by keys 219 to the shaft 100 and rotatable inside a body 220. The hub 99, to which are secured the eccentric 98, Figure 6, and crank body 139 as previously described, is formed integrally with or secured to the body 220 and is journalled on the shaft 100 as shown in Figure 9.

The driving member 218 has circumferentially spaced segmental extensions 221 adapted to engage a block 222 radially slidable in the body 220 and containing a wrist pin 223. A rocking lever 224, pivoted to the body 220 at 225, has a lower arm 226 extending outwardly from 220 and carrying a contact roller 227. The upper arm 228 of lever 224 carries a pin 229 which is connected by a link 230 with the wrist pin 223. A rod 231, slidable in a trunnion 232 mounted in the body 220, is pivotally attached to the pin 229 and is urged to the left by a spring 233. A vertical latch 234 urged upward by a spring 234a has a lower cross bar 235 adapted to enter a notch 236 in the rod 231. A lever 237, pivoted at 238 to the body 220 carries a trip roller 239 adapted to be engaged by the extensions 221, and has a fork 240 spanning a roller 241 on the latch 234.

A stationary guide 242 contains a vertically slidable plunger 243 in which is vertically reciprocable a second plunger 244. A latch 245 is slidable in the plunger 243 and is urged to the left by a spring 246. The latch 245 is provided with rollers 247 vertically moveable in slots 248 in a bell-crank 249 pivoted at 250 and connected to a vertical rod 251 having an upper inclined contact shoe 252.

The second plunger 244 has a lateral notch 253 to accommodate the end of latch 245, and is connected by a lower link 254 to a lever 255 fastened to a cross shaft 256. The shaft 256 is journalled in the side plate 40 and has fastened thereto an exterior lever 257 as shown on Figure 4. The lever 257, Figure 4, is connected through a pull rod 258, a lever 259 and a second pull rod 260 to the upper end of a bell crank 261 terminating in a pedal 262 at the front of the base 34.

Referring again to Figure 17, the plunger 243 rests on a block 263 vertically slidable on the second plunger 244 and linked to a lever 264 rockable on the cross shaft 265 and provided with a counter-weight 266. The cross shaft 265 pivotally supports the swinging lever 124 previously described in connection with Figure 6. A vertical rod 267, slidably disposed in the guide member 242 is linked to the lever 264. A compressior spring 268 urges the rod 264 upward, normally holding the lever 264 as shown in Figure 17, the block 263 holding the plunger 243 at the top of its travel.

As shown in Figure 17, the clutch is positioned for semi-automatic operation of the machine, in which the clutch is automatically disengaged after each working operation, after which the operator removes the completed work, places a new work piece in position, then restarts the machine by engaging the clutch manually.

The operation of the clutch under these conditions is as follows:

Assuming the rotation of the shaft to be counter-clockwise, as a working cycle is completed the contact roller 227 engages a concave block 243a adjustably secured to the top of the plunger 243. The further counter-clockwise motion of the body swings the lever 224 clockwise against the spring 233, drawing down the link 230 and block 222. The block 222 is thus drawn clear of the extension 221 of the driving member which is now free to idle. As the rod 231 is forced to the right the bar 235 snaps upward into the notch 236, thus locking the block 222 in retracted position. The roller 227 being stopped by the block 243a, and the clockwise swing of lever 224 being stopped by a pad 224a, the body 220 and all attached working parts of the machine are brought to rest.

To prevent possible rebound any suitable means may be used such as a pawl 269, Figure 4, adapted to engage the bottom of crank body 139 as the latter reaches right dead center.

In order to engage the clutch manually the operator raises his foot from the pedal 262, allowing a retracting spring 270, Figure 1, to swing the bell crank 261 clockwise. The lever 257 is thereby swung toward the right, turning the cross shaft 256 to raise the second plunger 244 until the latch 245 snaps into the notch 253. The operator now depresses the pedal 262, drawing down the second plunger 244 which, being latched to the plunger 243, retracts the latter downward in the guide member 242, freeing the contact roller 227. The first of extensions 221 which thereafter engages the roller 239 throws the lever 237 downward, forcing the cross bar 235 of latch 234 out of the notch 236. The spring 233 expands, rocking the lever 224 to the left against a second stop pad 224b, and causing the link 230 to move the block 222 upward. The succeeding extension 221 engages 222 and drives the body 220. The machine having thus been started, the roller 227 in sweeping counter-clockwise strikes and depresses the inclined shoe 252, withdrawing the latch 245 from notch 253 in second plunger 244. The plunger 243 is thus released and is raised by the action of the spring 268 to its upper position. As the body 220 completes a single revolution the contact roller 227 strikes the block 243a to disengage the clutch and stop the machine as previously described. It is evident from the above that the clutch automatically limits the machine to one revolution for each operation of the foot pedal. Accidental repeating with attendant injury to operator and damage to the machine or material is thus rendered impossible.

When it is desired to operate the machine continuously, fully automatically, as for instance when work pieces are supplied by any suitable type of automatic feed, it is necessary that the clutch 136 shall remain engaged. To accomplish this end the following provision is made:

Mounted on the cross shaft 265 is a swinging lever 124 previously noted, which has a shoulder 271 adapted to engage an opposing shoulder 272 on the lever 264. The lever 124 is connected by the rod 125 and pin 273 to a lever 274 fastened to a shaft 275 as shown in Figure 12. Shaft 275 carries a similar exterior lever 276 connected by a rod 277 to a hand lever 278 pivoted to the far side of the base 34 and having a positioning latch 279. When the lever 278 is moved to left position as in Figure 12, the lever 124 is swung clockwise. The shoulder 271, Figure 17, encounters the shoulder 272 on lever 264, rocking the latter clockwise, lowering the block 263 and plunger 243. The right end of lever 264 also engages a shoulder 280 on the lower end of the second plunger 244, holding the latter down.

The latch lever 281, pivoted at 282 and connected to the swinging lever 124 by a link 283, contains an upwardly spring pressed latch 284 having an inclined cam face 285. As the lever 124 is swung clockwise as noted above the latch 284 is pressed against the bottom of the bell crank 249. When the inclined shoe 252 is moved downward by its first engagement with the contact roller 227, thus sw:nging the bell crank 249 to the right, the latch 284 is forced upward to the left of 249, the cam face 285 wedging 249 farther to the right. The shoe 252 is thereby held clear of the roller during the succeeding revolutions of the clutch. The block 243a also remaining lower out of range of the roller 227, the clutch remains engaged to drive the machine continuously.

When the machine is being operated semiautomatically as previously noted, it is necessary that the pulsating table mechanism explained in connection with Figure 6 be tripped by the same manual action by which the clutch is engaged, as otherwise the upward pulsation occurring at the end of each return stroke would prevent unclamping and changing work pieces. For this purpose the following structure is provided:

An exterior lever 285, Figure 4, is fastened to the shaft 129 and is connected by a link 286 to an internally shouldered shell 287 containing a piston 288. The piston 288 has a rod 289 screwed into a clevis 290 pivoted to the bell crank 261. A tension spring 291 urges the lever 285 to the right.

When the pedal 262 is depressed to trip the clutch as previously described, the lever 285 is swung to the left by the linkage just described, rocking the shaft 129 and swinging the short lever 128 to the left. The release block 127, Figure 6, is thereby moved to the left. The spring motor is thereby tripped and pulsates the table upward as previously described. By screwing the piston rod 289 into or out of the clevis 290 the relative tripping position of the clutch and spring motor during the actuation of the pedal may be adjusted.

*Synchronizing power drive and flywheel*

A prime characteristic of the process of cold flowing is extreme smoothness. To carry out the process in the most advantageous manner possible it is therefore desirable that the power be applied as smoothly as possible. As the pressure overcome by the tool and the speed at which the pressure is overcome are inversely proportional, as previously set forth, the power during flow remains constant. The building up of the power from no load to the constant power required during flow, that is the overcoming of the material's elasticity, takes place at the very beginning of the tool stroke with very low velocity. There is no peak or heavy surge of power required such as occurs in the case of a punching operation where the maximum pressure is applied at high velocity accompanied by shock.

Theoretically, therefore, no flywheel effect would be necessary for cold flowing. In practice however, due to the high pressures developed, the pressure applying parts including the tool beam 185, primary tractor lever arms 181 and 182, etc., must be very massive. These parts consequently have a large combined inertia. At starting these parts from rest and during reversals of their motion the effect of their inertia would have a serious unbalancing effect on the smooth transmission of power from the prime mover to the work. In the present invention a flywheel and flexible synchronizing gear drive of the types disclosed in co-pending applications Serial No. 737,162 and Serial No. 737,154 are employed to maintain a smooth flow of power directly from the prime mover to the work, the flywheel normally doing no work on the material but serving to balance out the above described inertia effects of the working parts.

The structures and operation of the above combination are as follows:

A flywheel 292, Figure 9 and 10, is secured to a shaft 293 journalled in the side plate 40a and in a pedestal 294 secured to an extension 295 of the base 34. A herringbone gear 296 is also secured to the shaft 293 and is meshed with a gear 297 of larger diameter secured to the power shaft 100. A thrust bearing 298 is provided on the shaft 293 between the flywheel 292 and pedestal 294 to absorb end thrust generated due to natural weave as the flywheel delivers stored power to the power shaft, and a similar bearing 299 on the main shaft 100 between the gear 297 and main bearing housing 300 on the side plate 40a similarly absorbs the thrust of 297 when power is being stored in the flywheel.

A prime mover such as an electric motor 301, mounted on a suitable bracket 302, is connected to a shaft 303 journalled in a housing 304 secured to the side plate 40a°by bolts 305 as shown in Figure 18. The shaft 303 carries a worm 306 meshing with a gear ring 307 secured by means of screws 308 to guide plates 309 rotatably mounted on the power shaft 100. A driven member 310 is keyed to the shaft 100, and has radial slots 311 in which are slidable inclined plungers 312 retained by limiting screws 313 and urged outward by springs 314.

Driving blocks 315, slidable between the outer circumference 316 of the driven member 310 and the inner circumference 317 of the gear ring 307, are normally urged into lateral engagement with the plungers 312 by means of compression springs 318 backed by inclined blocks 319 secured to the guide plates 309.

Power is supplied by the motor 301, causing the worm 305 to drive the gear ring 307 clockwise, Figure 18, and with it the guide plates 309 and inclined blocks 319. The driving force is transmitted through the springs 314 to the driving blocks 315 which carry around the plungers 312 driving the member 310 and power shaft 100. The driving springs 318 are of such strength that in their position of maximum expansion, that is, with the driving blocks 315 stopped by the rear ends of inclined blocks 319 as shown in Figure 18, they exercise a moment about the shaft 100 just sufficient to balance the combined moments of inertia of all the driven parts including the flywheel. When therefore, the shaft 100 has been brought up to speed but before the working load is applied the parts revolve in the relation shown in Figure 18. When the load is applied with consequent slight slowing of the working parts the springs 318 contract in accordance with the intensity of the load, thus storing resilient energy. As the load drops off the springs expand, returning their stored energy and quickly accelerating the parts to their initial or synchronous speed. Similarly the device tends to maintain a constant working speed in case of sudden load irregularities such as may occasionally be encountered in working materials of defective or irregular structure.

The combined moment of inertia of the flywheel 292, shaft 293 and gears 296 and 297 is made substantially equal to the combined moments of inertia of all the other working parts. When the clutch 136 is engaged, or when the ram and attached linkages reverse their directions of motion the lag or inertia of rest is immediately balanced out by that of the moving flywheel system. In effect, therefore, the parts start without weight, allowing the prime mover to act directly through the cushion drive to the work. This balance between the flywheel effect and inertia of the working parts is of great importance, it having been found experimentally that a greater proportionate flywheel effect produced tearing and spoiled materials while too little such effect also produced unsatisfactory work due to irregular action.

The gearing up of the flywheel through the rolling mill gears 297 and 296 gives the wheel ample energy storing capacity to perform its balancing function with small drop in speed.

In the exceptional case of sudden rises in resistance to flow due to extraordinarily hard spots or similar defects in the material being worked the flywheel supplies added working energy in the ordinary manner.

When the motor 301 is stopped or slows down for any reason such as current failure the driven member 310 of the cushion drive mechanism, Figure 18, overruns the gear ring 307, the plungers 312 reciprocating in their slots 311 as they ride forward over the inclined blocks 319 and driving blocks 315. This device thus acts as a free-wheel, protecting the worm 306 and gear 307 from destructive strain of stopping the heavy working parts.

The action of the complete machine may be summarized as follows:

In accordance with the size and characteristics of the work piece 20 to be processed, the tool stroke is adjusted by means of the wheel 147 on the micrometer crank, the initial table height is set by the hand wheel 321, the table stroke is set by the hand wheel 89, the table pressure is set by the hand wheel 323, and the fracture proofing pressure is adjusted by means of the wheel 215.

The complete working cycle for semi-automatic operation is as follows:
 1. The work piece 20 is loaded in position.
 2. The pedal 262 is depressed, swinging levers 285 and 257 to trip the pulsating table mechanism and the clutch 136.
 3. The table rises, clamping the work, alining the tractor levers and insuring the high pressure linkage against lost motion. At the same time the clutch engages.
 4. The tool descends, flowing out the blank.
 5. The tool withdraws upward, retracting the fracture proofer as the upward stroke is completed. At the same time the table is drawn downward and the spring motor is cocked.
 6. The clutch automatically disengages and stops the work performing parts of the machine.
 7. The worked material is unloaded.

The full automatic working cycle is as follows:
 1. The work piece is loaded, preferably by any suitable automatic feeding means.
 2. The pulsating table mechanism is tripped to raise the table as previously described.
 3. The blank is flowed.
 4. The tool and fracture proofer are withdrawn. At the same time the table is lowered and the spring motor cocked.
 5. The worked material is unloaded and replaced with a fresh blank just prior to the next pulsation of the table.

From the foregoing it is evident that accurate timing of the table and clutch action with respect to that of the ram is essential to proper coordination of the functions. This is particularly true of declutching during semi-automatic operation and upward pulsation of the table during fully automatic operation. This timing is initially determined by proper angular installation of the clutch 136 and ececntric 98 with respect to the crank pin 141. A fine timing of the clutch disengagement may be made by adjusting the contact block 243a to right or left on the plunger 243, Figure 17. Similarly the timing of automatically tripping the spring motor may be delicately set by means of an adjustable wedge 324, Figure 6, adapted to move the block 109 to right or left for earlier or later engagement by the trip block 110. To provide for moving the ram by hand for testing adjustments or similar purpose a lever 325, Figures 4 and 15, is rotatably mounted on the cross shaft 164 and is connected by a link 326 to a socketed member 327 pivotally attached to the side plate 40 and adapted to receive a hand lever 328. A tapered hole 329 is provided extending in alinement through lever 325 and the shaft 164 when the parts are as shown in Figure 4. When it is desired to move the ram by hand, the safety shear pin 163a is removed from lever 163 and placed in the hole 329. Lever 163 is thus released from the shaft and hand lever 328 is connected to it, so that a movement of 328 acts through the high pressure linkage to move the ram 188.

The invention has been described throughout particularly in its function of carrying out the method of cold flowing as set forth in application Serial No. 702,286. However, it is also adapted to carry out the method of cold working various materials not adapted to cold flowing, for instance dissociate crystalline substances such as cast iron, as disclosed in copending application Serial No. 737,161. The machine operates on these materials in the same manner as described, but the portion 25 beneath the tool 22 instead of flowing downward as a solid plug undergoes a rapid progressive disintegration and drops out in pulverized form as fully described in the above noted application.

From the foregoing specification it is evident to those skilled in the art that as the above cited applications disclose methods radically different from the ordinary processes of working materials, so does the present invention, which is adapted to carry them out, necessarily differ both functionally and structurally from machine tools hitherto known to the art.

While the device is herein shown in preferred form, it is not limited to the exact structures illustrated, as various modifications may be made without departing from the scope of the appended claims.

What is claimed is:

1. In a machine tool in combination, a working tool, a fracture proofer cooperative therewith, a work table, means to pulsate said table, and means to actuate said tool whereby said tool may perform a complete working stroke between complete pulsations of said table.

2. In a machine tool in combination, a working tool, a fracture proofer cooperative therewith, a work table, means to pulsate said table to bring a work piece into compressive engagement with said tool and fracture proofer and adapted to hold said table stationary during a working stroke of said tool, and means to actuate said tool in timed relation to the pulsation of said table.

3. In a machine adapted to do work on a material, in combination, means to apply a pre-pressure to said material, means to map a work area in said material and to apply thereto a working pressure decreasing in substantially parabolic relation to the increase of yield of said material, and means to maintain a compressive pressure on a portion of said material adjacent said work area.

4. In a machine adapted to do work on a material in combination, means to apply a pre-pressure to said material, means to map a work area in said material and to apply thereto a working pressure decreasing in substantially parabolic relation to the increase of yield of said material, means to maintain a compressive pressure on a portion of said material adjacent said work area, manually adjustable means to predetermine said pre-pressure, and manually adjustable means to predetermine said compressive pressure.

5. In a machine tool in combination a power shaft, a prime mover, a tool beam, a working tool associated therewith, linkage including a tractor lever adapted to transmit power from said shaft to said beam to actuate said working tool, means to transmit power from said prime mover to said shaft, and inertia means to start said linkage and beam from rest.

6. In a machine tool in combination a power shaft, a prime mover, a tool beam, a working tool associated therewith, linkage including a tractor lever adapted to transmit power from said shaft to said beam to actuate said working tool at speed increasing in substantially parabolic relation to the increase of travel thereof, means to transmit power from said prime mover to said shaft, and inertia means to start said linkage and beam from rest.

7. In a machine tool in combination a power shaft, a prime mover, a tool beam, a working tool associated therewith, linkage including a tractor lever adapted to transmit power from said shaft to said beam to actuate said working tool, means to transmit power from said prime mover to said shaft, inertia means to start said linkage and beam from rest, a work table, and means operable by said shaft to pulsate said table.

8. In a machine tool in combination, a power shaft, a clutch on said shaft, a prime mover, a tool beam, a working tool associated therewith, linkage including a tractor lever adapted to transmit power from said shaft through said clutch to said beam whereby said working tool may be actuated, means to transmit power from said prime mover to said shaft, inertia means to start said linkage and beam from rest, a work table, means operable by said shaft through said clutch to pulsate said table, automatic means to disengage said clutch, and manual means to engage said clutch and actuate said pulsating means.

9. In a machine tool in combination, a power shaft, a clutch on said shaft, a prime mover, a tool beam, a working tool associated therewith, linkage including a tractor lever adapted to transmit power from said shaft through said clutch to said beam whereby said working tool may be actuated, means to transmit power from said prime mover to said shaft, inertia means to start said linkage and beam from rest, a work table, means operable by said shaft through said clutch to pulsate said table in timed relation to the actuation of said working tool, automatic means to disengage said clutch in timed relation to the actuation of said working tool, and manual means to engage said clutch and actuate said pulsating means.

10. In a machine tool in combination a power shaft, a prime mover, a tool beam, a working tool associated therewith, linkage including a tractor lever adapted to transmit power from said shaft to said beam to actuate said working tool, means to transmit power from said prime mover to said shaft, inertia means to start said linkage and beam from rest, a work table, means operable by said shaft to pulsate said table, manual means to vary the stroke of said working tool, manual means to vary the amplitude of pulsation of said table, and manual means to adjustably predetermine the power of said pulsation.

11. In a machine tool in combination a power shaft, a prime mover, a tool beam, a working tool associated therewith, linkage including a tractor lever adapted to transmit power from said shaft to said beam to actuate said working tool, resilient means including a free wheel to transmit power from said prime mover to said shaft, and inertia means to start said linkage and beam from rest.

12. In a machine adapted to produce cold flow in a material, means to apply a pre-pressure to said material in one direction, means to apply a working force to said material in the opposite direction, and means to maintain a portion of said material under fracture proofing compressive pressure during the application of said working force.

13. In a machine adapted to produce cold flow in a material, a tool, actuating means including a tractor lever associated with said tool, means to apply a pre-pressure through said material and tool to said actuating means whereby said tractor lever may be placed in infinite plane condition, means to actuate said tractor lever by rupture of said infinite plane condition to apply a working force through said tool to said material, and means to preserve said material from fracture.

14. In a machine adapted to produce cold flow in a material, means to apply a pre-pressure to said material in one direction, means to apply a working force to said material in the opposite direction at speed increasing in direct proportion to the decrease of resistance of said material to yield, and means to maintain a portion of said material under fracture proofing compressive pressure during the application of said working force.

CHARLES H. HOWLAND-SHEARMAN.